US009727252B2

(12) United States Patent
Costea et al.

(10) Patent No.: US 9,727,252 B2
(45) Date of Patent: Aug. 8, 2017

(54) METHODS AND SYSTEMS FOR OPTIMAL SNAPSHOT DISTRIBUTION WITHIN A PROTECTION SCHEDULE

(71) Applicant: Nimble Storage, In.c, San Jose, CA (US)

(72) Inventors: George Costea, Durham, NC (US); Eric Forgette, Clarence, NY (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 52 days.

(21) Appl. No.: 14/679,311

(22) Filed: Apr. 6, 2015

(65) Prior Publication Data

US 2016/0139823 A1 May 19, 2016

Related U.S. Application Data

(60) Provisional application No. 62/079,499, filed on Nov. 13, 2014.

(51) Int. Cl.
*G06F 11/00* (2006.01)
*G06F 3/05* (2006.01)
*G06F 3/06* (2006.01)

(52) U.S. Cl.
CPC ............ *G06F 3/0611* (2013.01); *G06F 3/065* (2013.01); *G06F 3/067* (2013.01); *G06F 3/0619* (2013.01); *G06F 3/0683* (2013.01)

(58) Field of Classification Search
CPC ........... G06F 14/30088; G06F 2201/84; G06F 11/14; G06F 11/16; G06F 17/30088; G06F 11/1446
See application file for complete search history.

(56) References Cited

U.S. PATENT DOCUMENTS

| 7,769,722 | B1 * | 8/2010 | Bergant | G06F 11/2097 |
| | | | | 707/681 |
| 8,091,087 | B2 | 1/2012 | Ali et al. | |
| 8,261,268 | B1 | 9/2012 | Forgette | |
| 8,352,938 | B2 | 1/2013 | Hunt et al. | |
| 8,489,699 | B2 | 7/2013 | Goggin et al. | |
| 8,566,542 | B1 | 10/2013 | Wang et al. | |
| 8,650,562 | B2 | 2/2014 | Hou et al. | |
| 8,656,018 | B1 | 2/2014 | Keagy et al. | |
| 8,688,935 | B1 | 4/2014 | Yochai et al. | |
| 8,725,973 | B2 | 5/2014 | Prahlad et al. | |

(Continued)

OTHER PUBLICATIONS

"13.5. Working with Snapshots", CloudStack, downloaded Apr. 17, 2014 from: http://cloudstack.apache.org/docs/en-US/Apache_CloudStack/4.1.1/html/Admin_Guide/working-with-snapshots.html, 3 pages.

(Continued)

*Primary Examiner* — David X Yi
*Assistant Examiner* — Candice Rankin
(74) *Attorney, Agent, or Firm* — Ascenda Law Group, PC

(57) ABSTRACT

Storage administrators would like to create snapshots of a storage array as frequently as possible, but too many concurrent snapshots can place an unnecessary load on the storage array. Described herein are techniques for scheduling snapshots on the storage array with the objective of minimizing the maximum number of simultaneous snapshots and/or temporally spacing apart snapshots from each other.

20 Claims, 9 Drawing Sheets

(56) References Cited

U.S. PATENT DOCUMENTS

| | | | |
|---|---|---|---|
| 8,745,237 | B2 | 6/2014 | Tsirkin et al. |
| 8,769,048 | B2 | 7/2014 | Kottomtharayil |
| 8,949,187 | B1 | 2/2015 | Satish et al. |
| 8,959,509 | B1 | 2/2015 | Sobel et al. |
| 9,092,376 | B1 | 7/2015 | Chelur et al. |
| 9,417,912 | B2 | 8/2016 | Suh et al. |
| 2002/0038296 | A1* | 3/2002 | Margolus .......... G06F 17/30097 |
| 2004/0068636 | A1 | 4/2004 | Jacobson et al. |
| 2007/0168404 | A1* | 7/2007 | Nakamura ............ G06F 17/302 |
| 2007/0244938 | A1 | 10/2007 | Michael et al. |
| 2007/0271560 | A1 | 11/2007 | Wahlert et al. |
| 2009/0177718 | A1 | 7/2009 | Patterson et al. |
| 2009/0300303 | A1 | 12/2009 | Balasubramanian |
| 2011/0047340 | A1 | 2/2011 | Olson et al. |
| 2011/0225582 | A1 | 9/2011 | Iikura et al. |
| 2012/0084501 | A1 | 4/2012 | Watanabe et al. |
| 2012/0131480 | A1 | 5/2012 | Kalmbach et al. |
| 2012/0323853 | A1 | 12/2012 | Fries et al. |
| 2013/0054911 | A1 | 2/2013 | Keller et al. |
| 2014/0026133 | A1 | 1/2014 | Parker |
| 2014/0052953 | A1 | 2/2014 | Ben-Tsion et al. |
| 2014/0189270 | A1* | 7/2014 | Iwanicki .......... G06F 17/30159 711/162 |
| 2014/0196039 | A1 | 7/2014 | Kottomtharayil et al. |
| 2015/0052108 | A1* | 2/2015 | Volk .................... G06F 11/1446 707/649 |
| 2015/0052528 | A1 | 2/2015 | French et al. |
| 2016/0203013 | A1 | 7/2016 | Bayapuneni et al. |

OTHER PUBLICATIONS

Throttling Replication Director Operations with NetBackup, Enterprise Support, Symantec Corporation (updated Sep. 29, 2013), downloaded Apr. 17, 2014 from: https://support.symantec.com/en_US/article.HOWTO87048.html, 19 pages.
"VM Snapshots: What they are and how to use them", Aug. 4, 2011, 2 pages.
Barr, "Veeam Enables Dramatically Better RPOs with Backup from Storage Snapshots," Veeam News Room, dated May 20, 2013, 7 pages.
Daemonchild, "vSphere Snapshots (Part 1)," dated Dec. 15, 2010, 5 pages.
Das, "SnapManager 2.0 for Virtual Infrastructure Best Practices," NetApp, Technical Report (Jan. 2010), 37 pages.
Dell Equallogic, "Auto-Snapshot Manager/Microsoft Edition for Hyper-V," Solution Brief, 2009, 2 pages.
Equallogic, "PS Series Storage Arrays," Group Administration PS Series Firmware Version 5.0 dated Jun. 2010, 256 pages.
Experts Exchange, LLC, "Best order in which I should commit ESX Snapshots," dated Feb. 19, 2009, 15 pages.
Hazelman, Doug, "Countdown to v7—Backup from Storage Snapshots," Veeam, dated Jun. 24, 2013, 8 pages.
Jokeru, "The 'high load vm/ esxi nfs backup error' story," Wiki'ed, dated Mar. 19, 2014, 5 pages.
Microsoft, "Hyper-V Virtual Machine Snapshots: FAQ," dated Mar. 11, 2009, 3 pages.
Redhat, "Using Virtual Machine Snapshots," Redhat Customer Portal, date of access Aug. 29, 2014, 3 pages.
Search VMWARE.com,"Deleting virtual machine snapshots without wasting disk space," Tech Target, dated Mar. 11, 2011, 5 pages.
Siebert; et al., "Mistakes Made When Backing Up VMs & How to Prevent Them," Tech Target (2011), 13 pages.
Sina Esfandiarpoor; All Pahlavan; Maziar Goudarzi, "Virtual Machine Consolidation for Datacenter Energy Improvement," Sharif University of Technology, Feb. 9, 2013, 11 pages.
Techtarget, SearchStorage.com, "Storage Snapshot," dated Jul. 19, 2005, 1 page.
Timothy Dewin, "What is the buzz around Backup from Storage Snapshots anyway?" Timo's Techie Corner, dated May 21, 2014, 8 pages.
UP2V, "Know the performance impact of snapshots used for backup," dated May 9, 2011, 8 pages.
Veeam, "How to create backups from storage snapshots with Veeam," Veeam Backup & Replication v7, dated Jun. 2014, 6 pages.
Veeam, "Snapshot removal issues of a large VM," VMware vSphere Community Forums, dated Jan. 19, 2010, 6 pages.
Veeam. "Step 3. Define VM Processing Order: User Guide for Veeam Backup Enterprise Manager," Veeam Backup Enterprise Manager 7.0, dated Nov. 18, 2013, 2 pages.
VMware, "Best practices for virtual machine snapshots in the VMware environment," VMware Knowledge Base, dated Dec. 20, 2013, 3 pages.
VMware, "Understanding Snapshots," Managing Virtual Machines, date of access Aug. 29, 2014, 2 pages.
VMware, "Understanding virtual machine snapshots in VMware ESXi and ESX," VMware Knowledge Base, dated Aug. 11, 2014, 5 pages.
VMware, "VMware vSphere Snapshot Best Practices," Apr. 17, 2014, 7 pages.
Vnoob, "Configure VM Snapshots for Crash-Consistent Quiescing with PowerCLI," Professional VMware, dated Dec. 14, 2012, 6 pages.
Forgette, Eric; et al. "Methods and Systems for Concurrently Taking Snapshots of a Plurality of Virtual Machines", U.S. Appl. No. 14/509,885, filed Oct. 8, 2014, 62 pgs.
Chelur, Raja Shekar; et al., "Methods and Systems for Ordering and Removing Virtual Machine Snapshots", U.S. Appl. No. 14/474,014, filed Aug. 29, 2014, 52 pgs.
"About schedule options for creating recovery points", Symantec Corporation (Jan. 5, 2008), downloaded Sep. 5, 2014 from: http://www.symantec.com/docs/HOWTO13633, 5 pgs.
"Backup Schedule Options", Symantec Corporation (Jan. 1, 2010), downloaded Sep. 5, 2014 from: http://www.symantec.com/docs/HOWTO23716, 2 pgs.
"CommCell Scalability Guide", CommVault Systems, downloaded Sep. 5, 2014 from: http://documentation.commvault.com/hds/v10/article?p=features/scalability/commcell.htm, 12 pgs.
"Create a Scheduled Task in the vSphere Web Client", Vmware vSphere 5.1 Documentation Center, downloaded Sep. 5, 2014 from http://pubs.vmware.com/vsphere-51/topic/com.vmware.vsphere.vcenterhost.doc/GUID-03B90638-6C70-4379-8CAF-D66866D115F4.html, 5 pgs.
"EMC VNXe Data Protection", EMC White Paper (Jan. 2013), 28 pgs.
"FalconStor Snapshot Director for VMware vSphere: User Guide", FalconStar Software, accessed Sep. 5, 2014, Version 5.00, 57 pgs.
"Managing Schedules for Snapshots and Replicas", PS Series Group Administration, downloaded Sep. 5, 2014 from: http://psonlinehelp.equallogic.com/V3.3/managing_schedules_for_snapshots_and_replicas.htm, 6 pgs.
"Multi-Instance Snap Optimization" CommVault Systems, downloaded Sep. 5, 2014 from: http://documentation.commvault.com/hds/v10/article?p=products/oracle/snap/snap_optimization.htm, 31 pgs.
"Multiple Nimble Microsoft VSS snapshots?", NimbleConnect (Jul. 2014), downloaded Sep. 5, 2014 from: https://connect.nimblestorage.com/thread/1714, 4 pgs.
"Pillar Axiom Data Protection Manager: Application-Consistent Automated Clone Management", Oracle Data Sheet (2013), 2 pgs.
"Scheduling—Getting Started", CommVault Systems, downloaded Sep. 5, 2014 from: http://documentation.commvault.com/hds/v10/article?p=features/scheduling/getting_started.htm, 6 pgs.
"Scheduling snapshots for multiple SQL instances in a Windows cluster?" NetApp Community (Sep.-Oct. 2011), downloaded Sep. 5, 2014 from: https://communities.netapp.com/thread/17429, 5 pgs.
"Stagger Snapshot copy schedules to avoid transfer conflicts", NetApp (2009), downloaded Sep. 5, 2014 from: https://library.netapp.com/ecmdocs/ECMM1224454/html/rnote/rel_notes/concept/c_oc_rn_lim-dp-snapshot-stagger.html, 1 pg.
Gilman; et al., "How Dell EqualLogic Auto-Snapshot Manager / Vmware Edition Helps Protect Virtual Environments" Dell Power Solutions (Nov. 2008), pp. 42-45.

(56) References Cited

OTHER PUBLICATIONS

Padron; et al., "A Case Study for Successful Deployment : Tivoli Storage Manager for Virtual Environments Data Protection for Vmware", IBM (Jun. 30, 2014), V1.0, 28 pgs.
Vmware, "vSphere Monitoring and Performance", vSphere 5.5._vCenter Server 5.5_ESXi 5.5, 176 pgs, waybackmachine archived: https://web.archive.org/web/20140123174827/http://pubs.vmware.com/vsphere-55/topic/com.vmware.ICbase/PDF/vsphere-esxi-vcenter-server-55-monitoring-performance-guide.pdf, Jan. 23, 2014.

* cited by examiner

Table for Candidate Starting Minute at 10:00

| Minute | Number of Simultaneous Snapshots |
|---|---|
| 10:00 | 4 |
| 10:30 | 3 |
| 11:00 | 2 |
| 11:30 | 5 |

Fig. 5A

Table for Candidate Starting Minute at 10:01

| Minute | Number of Simultaneous Snapshots |
|---|---|
| 10:01 | 0 |
| 10:31 | 1 |
| 11:01 | 1 |
| 11:31 | 0 |

Fig. 5B

Table for Candidate Starting Minute at 10:02

| Minute | Number of Simultaneous Snapshots |
|---|---|
| 10:02 | 0 |
| 10:32 | 0 |
| 11:02 | 0 |
| 11:32 | 0 |

Fig. 5C

| Candidate Starting Minute | Maximum Number of Simultaneous Snapshots |
|---|---|
| 10:00 | 5 |
| 10:01 | 1 |
| 10:02 | 0 |
| ... | ... |
| 10:29 | 0 |
| 10:30 | 5 |
| 10:31 | 1 |
| 10:32 | 0 |
| ... | ... |
| 10:59 | 0 |

Fig. 6

| Candidate Starting Minute | Satisfy first criterion? |
|---|---|
| 10:00 | No |
| 10:01 | No |
| 10:02 | Yes |
| ... | ... |
| 10:29 | Yes |
| 10:30 | No |
| 10:31 | No |
| 10:32 | Yes |
| ... | ... |
| 10:59 | Yes |

Fig. 7

| Table for Candidate Starting Minute at 10:00 | |
|---|---|
| Minute | Number of Simultaneous Snapshots |
| 10:00 on Mon | 4 |
| 10:30 on Mon | 3 |
| 11:00 on Mon | 2 |
| 11:30 on Mon | 5 |
| 10:00 on Wed | 0 |
| 10:30 on Wed | 1 |
| 11:00 on Wed | 6 |
| 11:30 on Wed | 4 |
| 10:00 on Fri | 3 |
| 10:30 on Fri | 7 |
| 11:00 on Fri | 1 |
| 11:30 on Fri | 0 |

Fig. 8A

| Table for Candidate Starting Minute at 10:01 | |
|---|---|
| Minute | Number of Simultaneous Snapshots |
| 10:01 on Mon | 0 |
| 10:31 on Mon | 1 |
| 11:01 on Mon | 1 |
| 11:31 on Mon | 0 |
| 10:01 on Wed | 2 |
| 10:31 on Wed | 5 |
| 11:01 on Wed | 1 |
| 11:31 on Wed | 3 |
| 10:01 on Fri | 3 |
| 10:31 on Fri | 1 |
| 11:01 on Fri | 3 |
| 11:31 on Fri | 2 |

Fig. 8B

| Table for Candidate Starting Minute at 10:02 | |
|---|---|
| Minute | Number of Simultaneous Snapshots |
| 10:02 on Mon | 0 |
| 10:32 on Mon | 0 |
| 11:02 on Mon | 0 |
| 11:32 on Mon | 0 |
| 10:02 on Wed | 1 |
| 10:32 on Wed | 1 |
| 11:02 on Wed | 3 |
| 11:32 on Wed | 0 |
| 10:02 on Fri | 0 |
| 10:32 on Fri | 2 |
| 11:02 on Fri | 2 |
| 11:32 on Fri | 1 |

Fig. 8C

METHODS AND SYSTEMS FOR OPTIMAL SNAPSHOT DISTRIBUTION WITHIN A PROTECTION SCHEDULE

RELATED APPLICATIONS

This application is a non-provisional patent application of and claims priority to U.S. Provisional Application No. 62/079,499, filed 13 Nov. 2014, which is assigned to the assignee of the present invention and is incorporated by reference herein.

FIELD OF THE INVENTION

The present invention relates to methods and systems for scheduling snapshots, and more specifically, in one embodiment, relates to scheduling snapshots with the objective of minimizing the maximum number of snapshots that are simultaneously scheduled.

BACKGROUND

Snapshots are used to capture the state of a storage array (or other storage device) at certain moments in time. Often, snapshots are created in accordance with a protection schedule that specifies the moments at which the snapshots are to be created. While protection schedules can be configured by individuals, in many instances, such protection schedules are not optimally configured, resulting in a reduction in the storage array performance (e.g., increased time to process a read/write request).

SUMMARY OF THE INVENTION

In accordance with one embodiment, a snapshot scheduler is provided to optimally schedule snapshots under certain constraints. For example, the scheduling of snapshots may be constrained by pre-existing snapshot schedules. If a large number of snapshots are already scheduled at a certain time, it may not be desirable to schedule an additional snapshot at that time (which could reduce the storage array performance). The scheduling of snapshots may additionally be constrained by user-specified parameters (e.g., start hour for snapshot schedule, end hour for snapshot schedule, snapshot interval, and/or day(s) of the week for the snapshot schedule).

In accordance with one embodiment, the snapshot scheduler may generate a plurality of candidate snapshot schedules that satisfy the user-specified constraints. Each of the candidate snapshot schedules may be specified by a start time, an end time, a snapshot interval, and/or snapshot day(s) of the week. In some instances, the user-specified parameters may completely constrain a candidate snapshot schedule, except for the exact starting time.

In accordance with one embodiment, the snapshot scheduler may then select one of the candidate snapshot schedules in light of the pre-existing snapshot schedules (if any). For example, the snapshot scheduler may select a set of the candidate snapshot schedules that are associated with the lowest maximum number of simultaneous snapshots (e.g., to minimize the peak load). From the selected set of candidate snapshot schedules, the snapshot scheduler may select a subject one of the candidate snapshot schedules based on respective start times of the candidate snapshot schedules (e.g., to temporally spread out the snapshots from one another).

In accordance with another embodiment, instead of the snapshot scheduler selecting a candidate snapshot schedule from the set of the candidate snapshot schedules associated with the lowest maximum number of simultaneous snapshots, a user may be allowed to perform this selection (i.e., selecting one of the candidate snapshot schedules from the set that minimizes the peak load).

These and other embodiments of the invention are more fully described in association with the drawings below.

BRIEF DESCRIPTION OF THE DRAWINGS

FIGS. 5A-5C depict tables tabulating the number of simultaneous snapshots for each time instance within candidate snapshot schedules, in accordance with one embodiment.

FIG. 6 depicts a table tabulating the maximum number of simultaneous snapshots corresponding to each candidate starting time, in accordance with one embodiment.

FIG. 7 depicts a table recording whether each candidate starting time satisfies a first criterion, in accordance with one embodiment.

FIGS. 8A-8C depict tables tabulating the number of simultaneous snapshots for each time instance within multi-day candidate snapshot schedules, in accordance with one embodiment.

DETAILED DESCRIPTION OF THE INVENTION

System Overview

Figure 1:
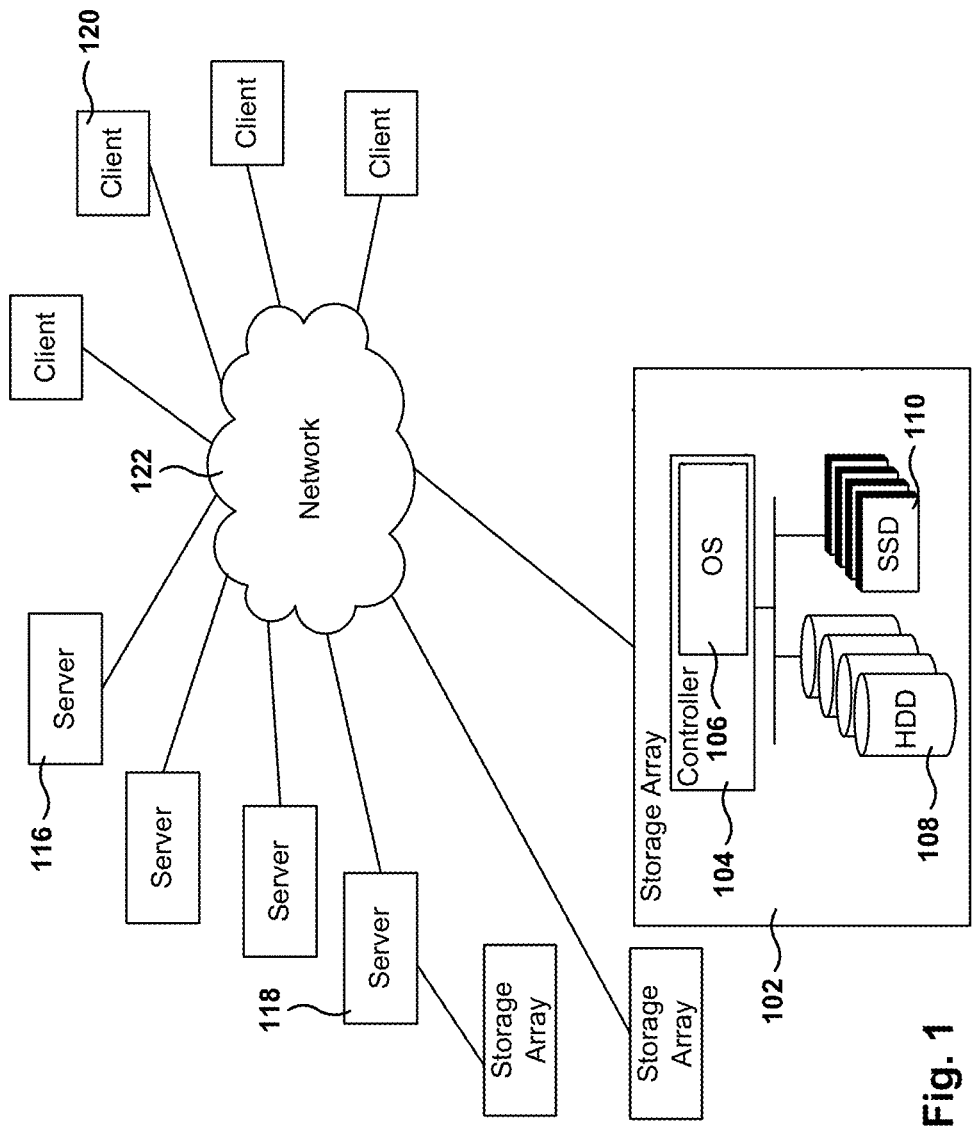
FIG. 1 depicts a system with network storage, in accordance with one embodiment.

In the example architecture of FIG. 1, one or more storage arrays 102 provide storage services to one or more servers 116, 118 (which are referred to herein as hosts) and to one or more clients 120. The configuration will depend on the implementation of the storage array and the demand by application. Network 122 provides transport for the data exchanges between the storage array 102 and servers 116 or clients 120. In addition, server 118 may be directly connected to a storage array without communicating through network 122. Storage array 102 includes one or more controllers 104, one or more hard disk drives (HDD) 108, and one or more solid state drives (SSD) 110, also referred to herein as flash cache. Within the one or more controllers 104, a storage operating system 106, a snapshot scheduler (not depicted) and a snapshot manager (not depicted) may be instantiated.

Figure 2:
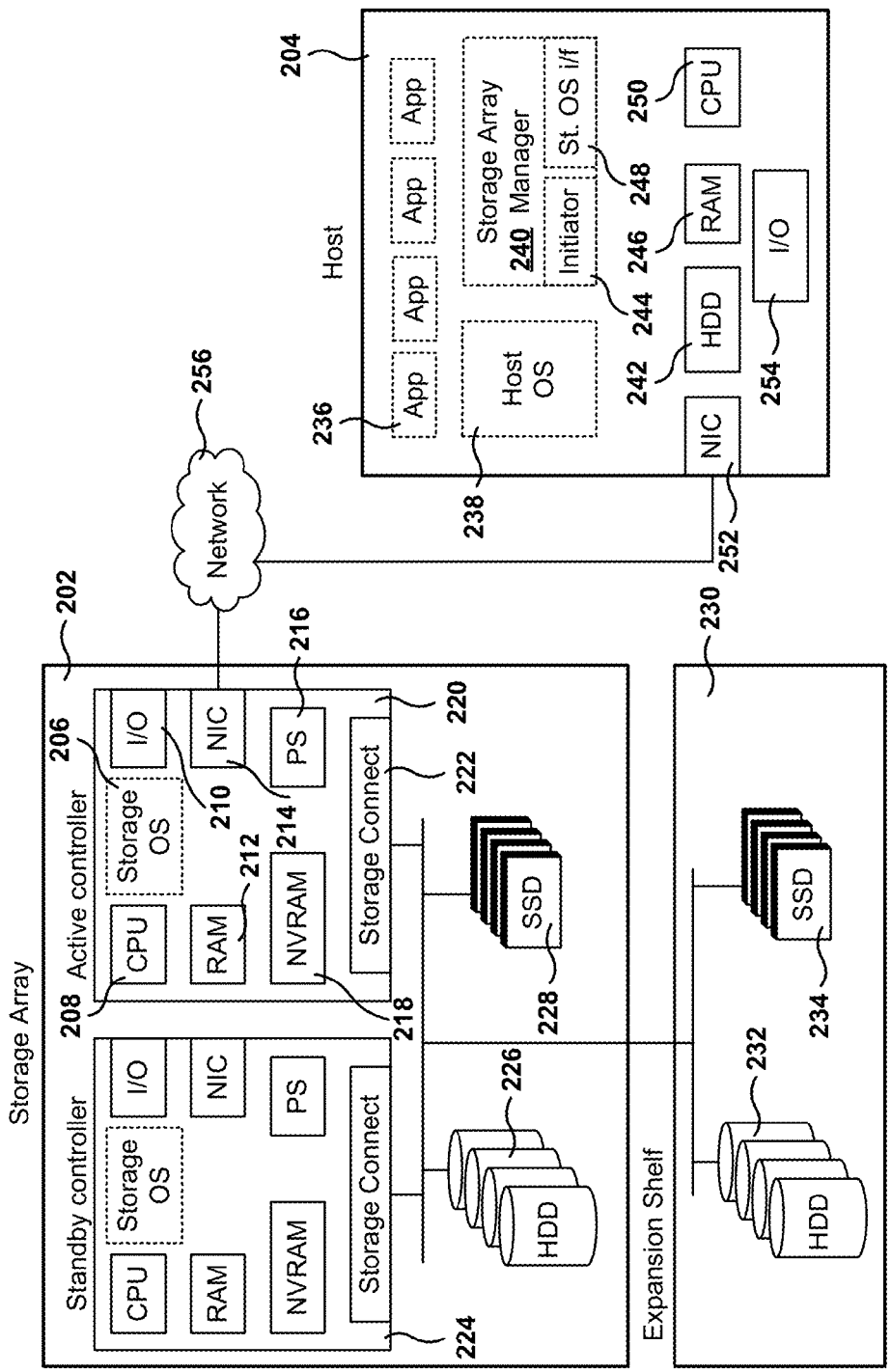
FIG. 2 illustrates the architecture of a storage array, in accordance with one embodiment.

FIG. 2 illustrates an example architecture of a storage array 102, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array.

After the data is processed (e.g., compressed and organized in segments (e.g., coalesced)), the data is transferred from the NVRAM 218 to HDD 226, or to SSD 228, or to both.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, standby controller 224 includes the same components as active controller 220.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 256, and the storage array 202 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 202 to applications 236. Storage array manager 240 includes an initiator 244 and a storage OS interface program 248. When an IO operation is requested by one of the applications 236, the initiator 244 establishes a connection with storage array 202 in one of the supported formats (e.g., iSCSI, Fibre Channel, or any other protocol). The storage OS interface 248 provides console capabilities for managing the storage array 202 by communicating with the active controller 220 and the storage OS 206 executing therein.

To process the IO requests, resources from the storage array 202 are required. Some of these resources may be a bottleneck in the processing of storage requests because the resources are over utilized, or are slow, or for any other reason. In general, the CPU and the hard drives of the storage array 202 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

The hard disks may also become a bottleneck because the inherent access speed to data is slow when compared to accessing data from memory (e.g., NVRAM) or SSD 228.

Embodiments presented herein are described with reference to CPU and HDD bottlenecks, but the same principles may be applied to other resources, such as a system with insufficient amount of NVRAM.

One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access the storage elements, which in one embodiment includes hard disk drives (HDDs) 226, 232 and solid-state drives (SSDs) 228, 234.

As used herein, SSDs functioning as flash cache, should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 206 is configured with an algorithm that allows for intelligent writing of certain data to the SSDs 228 (e.g., cache-worthy data), and all data is written directly to the HDDs 226 from NVRAM 218.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 206 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228, serving as storage cache, is different than "instruction level processing," which is a common function in microprocessor environments. In one example, microprocessor environments utilize main memory and various levels of cache memory (e.g., L1, L2, etc.). Instruction level caching is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 206, which can differentiate between the types of blocks being processed for each type of application or applications. That is, block data being written to the storage elements (e.g., HDDs 226, HDDs 232, SSDs 228 and/or SSDs 234) can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 206, for efficient use of flash cache 228.

Continuing with the example of FIG. 2, the active controller 220 is shown including various components that enable efficient processing of storage block reads and writes. The standby controller 224 is configured to provide redundancy, and will not be described in detail aside from noting that either all or most or some of the components of the active controller 220 can be provided by standby controller 224. Continuing with the example of the active controller 220, the CPU 208 is configured to manage various systems and provide processing power for the storage operations of the storage array 102. In one embodiment, a network interface card (NIC) 214 is provided to interface the storage array to the network 256. The NIC 214, in one embodiment is configured to access the network 256 utilizing a TCP/IP protocol (e.g., Ethernet).

Introduction of Optimal Snapshot Distribution

When creating a plurality of snapshots on an array (e.g., a storage array), it is advantageous to temporally distribute the snapshots in such a manner that minimizes the maximum number of simultaneous snapshots (e.g., snapshots that are performed at the same time on the array). If a large number of snapshots were to occur at the same time (i.e., large relative to the resources of the array), an unnecessarily high load would be placed on the array, decreasing the performance of the array. While there is some flexibility on when to schedule snapshots, this flexibility is not unlimited. Often snapshots need to adhere to a protection schedule, which may specify one or more of the start time, end time and snapshot interval (minutely, hourly, etc.) for a periodic sequence of snapshots, and may additionally specify the day(s) on which snapshots are to be taken. Therefore, it is desired to temporally distribute the snapshots while still adhering to the constraints imposed by the protection schedule.

In accordance with one embodiment, instead of requesting the user to specify an exact start time and/or end time (e.g., start minute and/or end minute) for the sequence of snapshots, the user is only requested to specify an approximate start time and/or end time (e.g., start hour and/or end hour). A snapshot scheduler (which could be part of a snapshot scheduling wizard) then selects an exact start time and/or end time (e.g., start minute and/or end minute) based on one or more of the user-specified constraints of approximate start time, approximate end time, snapshot interval, snapshot days, and based on any pre-existing snapshot schedules (i.e., snapshot schedules that have already been scheduled).

Figure 3:
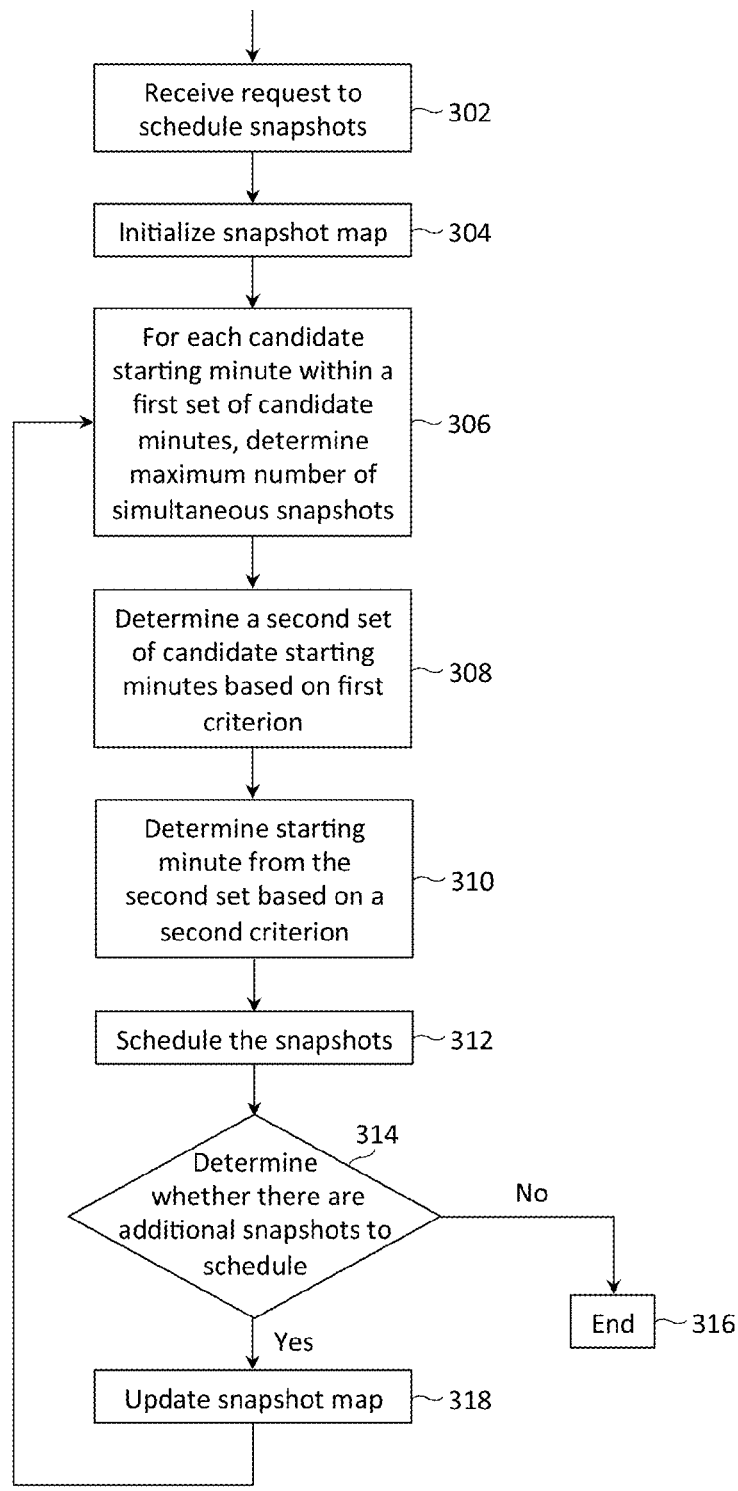
FIG. 3 depicts a flow diagram of a process for scheduling a plurality of snapshots, in accordance with one embodiment.

FIG. 3 is an overview of an algorithm to schedule a plurality of snapshots (e.g., a sequence of snapshots over time), in accordance with one embodiment. At step 302, the snapshot scheduler may receive a request to schedule snapshots according to a protection schedule. At step 304, the snapshot scheduler may initialize a snapshot map. At step 306, the snapshot scheduler may, for each candidate starting minute (or more generally, each candidate starting time) within a first set of candidate minutes (or more generally, a first set of candidate times), determine the maximum number of simultaneous snapshots over a candidate snapshot schedule starting at the candidate starting minute. At step 308, the snapshot scheduler may determine a second set of candidate starting minutes (or more generally, a second set of candidate starting times) based on a first criterion. At step 310, the snapshot scheduler may determine the starting minute (or more generally, the starting time) from the second set based on a second criterion. At step 312, the snapshot scheduler may schedule a plurality of snapshots in accordance with the determined starting minute and constraints imposed by a protection schedule. At step 314, the snapshot scheduler may determine whether there are additional requests (i.e., requests to schedule snapshots). If not, the algorithm concludes at step 316. If there are additional requests, the snapshot scheduler may update the snapshot map at step 318. The algorithm may then repeat from step 306, during which the maximum number of simultaneous snapshots may be determined for each of the candidate starting times.

While not depicted in FIG. 3, a snapshot manager may perform snapshots of the array at the times that snapshots have been scheduled. It is noted that a snapshot of the array does not necessarily mean that a snapshot is taken of the entire array. Rather, a snapshot may be taken of a portion of the storage elements of the array (e.g., a particular disk, a particular datastore, a particular volume, a particular vvol, one or more of HDDs 226, one or more of HDDs 232, one or more of SSDs 228, one or more of SSDs 234, etc.).

FIG. 3 is now described in more detail.

Receive a Request to Schedule Snapshots

In accordance with one embodiment, the request to schedule snapshots may include a protection schedule, which may specify the start hour, end hour and snapshot interval (minutely, hourly, etc.) at which snapshots are to be taken, and may additionally specify the day(s) on which snapshots are to be taken. The task for the snapshot scheduler is then to select the starting minute and ending minute within the start hour and end hour, respectively.

Initialize Snapshot Map

In accordance with one embodiment, the snapshot map may be initialized (and/or constructed) based on pre-existing snapshot schedules (i.e., snapshot schedules that have already been scheduled for the array). For each minute (or more generally, for each time instance) within a duration of time, the snapshot scheduler may count the number of snapshots that have already been scheduled (by pre-existing snapshot schedules) for that minute (or that time instance). A snapshot map may be a table or plot that maps each minute (or each time instance) within the time duration to the number of simultaneous snapshots scheduled for that minute (or that time instance). The time duration may be one week (e.g., 00:00 Sunday-23:59 Saturday) since protection schedules often span a week.

A snapshot map may provide a storage administrator with an overview of the current state of the snapshots scheduled on an array. Minutes with the most concurrent snapshots may be interpreted by the storage administrator to be the "hottest" minutes, and minutes with the fewest number of concurrent snapshots (possibly no snapshots) may be interpreted by the storage administrator to be the "coolest" minutes, where such adjectives are used in the context where the snapshot map is depicted (or interpreted) as a heat map (i.e., where values of the map are depicted as colors). Such adjectives, of course, should not be interpreted literally, as there is no "temperature" actually associated with a snapshot map.

Figure 4:
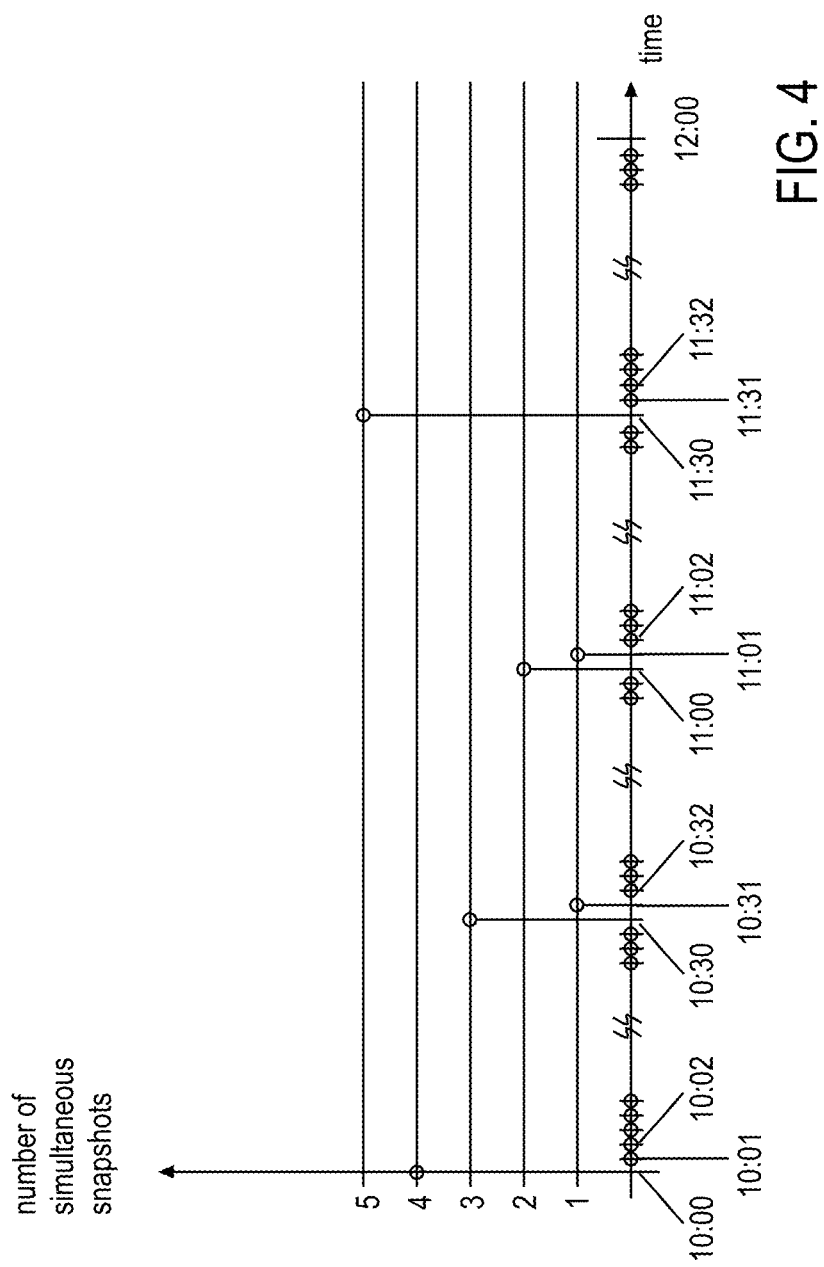
FIG. 4 depicts a snapshot map recording the number of snapshots that are simultaneously scheduled at each time instance, in accordance with one embodiment.

FIG. 4 depicts an exemplary snapshot map that spans from 10:00 to 12:00. For each minute from 10:00 to 12:00, the snapshot map depicts the number of simultaneous snapshots that are scheduled for that minute. For instance, at 10:00, there are 4 simultaneous snapshots that are scheduled; at 10:01, no snapshots are scheduled; and so on. To elaborate, the simultaneous snapshots may be the accumulation of snapshots scheduled by pre-existing snapshot schedules having different start times. For example, there may be one pre-existing snapshot schedule that is scheduled to take snapshots at 8:00, 8:30, 9:00, 9:30 and 10:00; one pre-existing snapshot schedule that is scheduled to take snapshots at 8:30, 9:00, 9:30, 10:00 and 10:30; and two pre-existing snapshots schedules that are scheduled to take snapshots at 9:00, 9:30, 10:00, 10:30 and 11:00. As a result of these four pre-existing snapshot schedules, there are 4 snapshots simultaneously scheduled at 10:00, 3 snapshots simultaneously scheduled at 10:30, and 2 snapshots simultaneously scheduled at 11:00. It is noted that the above-described pre-existing snapshot schedules are only some of the pre-existing snapshot schedules that contribute to the snapshot map of FIG. 4. To elaborate further, the pre-existing snapshot schedules need not be directed at the same portion of an array. For instance, the above-described snapshot schedule starting at 8:00 could take snapshots of disk A of the array, while the snapshot schedule starting at 8:30 could take snapshots of disk B of the array.

Since there are too many data points than can be clearly depicted in FIG. 4, only certain time periods from 10:00 to 12:00 have been depicted for clarity, but using other plotting methods (e.g., line plot, heat map), it is expected that all data points could be depicted. For the remainder of the discussion, it is assumed that the data points that have not been depicted are all 0 (i.e., 0 in value). It is noted that the snapshot map need not actually be plotted for the algorithm of FIG. 3 to function properly. Plotting of the snapshot map is merely one way to convey the information of the snapshot map to a storage administrator, but such information need not be conveyed to the storage administrator.

It is noted that FIG. 4 is a simplified example, as snapshot maps typically span an entire week or more.

Determine Maximum Number of Simultaneous Snapshots within Candidate Snapshot Schedule As mentioned above, the snapshot scheduler may select the starting minute and ending minute within the start hour and end hour, respectively. However, once the starting minute is selected, the ending minute may be determined automatically since the snapshots are typically required to be performed periodically with a set interval (i.e., the ending minute would be the last minute in the end hour that adheres to the snapshot interval). Hence, in many cases, the snapshot scheduler only needs to select the starting minute (or more generally, starting time) within the start hour (or more generally, starting optimization window).

Since there are sixty minutes within an hour, there are sixty possible candidate starting minutes (and hence sixty possible candidate snapshot schedules). For ease of explanation, these sixty possible candidate starting minutes will be referred to as the first set of candidate starting minutes (or more generally, the first set of candidate starting times).

As a first step to selecting one of the candidate starting minutes, the snapshot scheduler may determine the maximum number of simultaneous snapshots (i.e., already scheduled snapshots) over each of the candidate snapshot schedules. A simplified example may be helpful here. For example, suppose snapshots are to be created between 10:00-12:00 (i.e., between the start hour of 10:00 and the end hour of 11:00) with a set interval of 30 minutes. In this example, the first set of candidate starting minutes would be 10:00, 10:01, . . . , 10:58, and 10:59. For the candidate starting minute at 10:00, the candidate snapshot schedule would be 10:00, 10:30, 11:00, 11:30; for the candidate starting minute at 10:01, the candidate snapshot schedule would be 10:01, 10:31, 11:01, 11:31; for the candidate starting minute at 10:02, the candidate snapshot schedule would be 10:02, 10:32, 11:02, 11:32; and so on.

Supposing the snapshot map of FIG. 4 were applicable to the instant example, the maximum number of simultaneous snapshots for the candidate snapshot schedule starting at 10:00 would be 5 (i.e., the maximum of 4, 3, 2, 5); the maximum number of simultaneous snapshots for the candidate snapshot schedule starting at 10:01 would be 1 (i.e., the maximum of 0, 1, 1, 0); and so on. The maximum number of simultaneous snapshots for each of the candidate starting minutes is tabulated in the table depicted in FIG. 6.

To aid with the understanding of the table depicted in FIG. 6, an intermediate set of tables may be constructed (as depicted in FIGS. 5A-5C). In each table, the left column lists the minutes (or more generally, the time instances) at which snapshots are to be taken for each candidate snapshot schedule, and the right column lists the number of simultaneous snapshots during each of those minutes (or more generally, those time instances).

For example, the table in FIG. 5A is constructed for the candidate snapshot schedule starting at 10:00. The instant table can be constructed by simply reading from the snapshot map of FIG. 4. At minute 10:00, there are 4 simultaneous snapshots; at minute 10:30, there are 3 simultaneous snapshots; at minute 11:00, there are 2 simultaneous snapshots; and at minute 11:30, there are 5 simultaneous snapshots.

The table in FIG. 5B is constructed for the candidate snapshot schedule starting at 10:01. The instant table can be constructed by simply reading from the snapshot map of FIG. 4. At minute 10:01, there are 0 simultaneous snapshots; at minute 10:31, there is 1 snapshot; at minute 11:01, there is 1 snapshot; and at minute 11:31, there are 0 simultaneous snapshots.

The table in FIG. 5C is constructed for the candidate snapshot schedule starting at 10:02. The instant table can be constructed by simply reading from the snapshot map of FIG. 4. At minute 10:02, there are 0 simultaneous snapshots; at minute 10:32, there are 0 simultaneous snapshots; at minute 11:02, there are 0 simultaneous snapshots; and at minute 11:32, there are 0 simultaneous snapshots. Tables may be constructed in a similar manner for each of the remaining candidate snapshot schedules starting at minute 10:03, minute 10:04, minute 10:05, etc.

Now, returning to the table of FIG. 6, the maximum number of simultaneous snapshots may be determined based on the intermediate set of tables depicted in FIGS. 5A-5C. The maximum number of simultaneous snapshots for the candidate snapshot schedule starting at 10:00 (with a 30 minute snapshot interval) is the maximum number of simultaneous snapshots in the table of FIG. 5A (i.e., maximum of 4, 3, 2, 5), which is 5. The maximum number of simultaneous snapshots for the candidate snapshot schedule starting at 10:01 is the maximum number of simultaneous snapshots in the table of FIG. 5B (i.e., maximum of 0, 1, 1, 0), which is 1. The maximum number of simultaneous snapshots for the candidate snapshot schedule starting at 10:02 is the maximum number of simultaneous snapshots in the table of FIG. 5C (i.e., maximum of 0, 0, 0, 0), which is 0. One can apply a similar process to arrive at the maximum number of simultaneous snapshots for the remainder of the candidate starting minutes.

Determine Second Set of Starting Minutes Based on a First Criterion

The snapshot scheduler may determine whether each of the candidate starting minutes (or more generally, the candidate starting times) from the first set satisfies a first criterion. In one embodiment, the first criterion is whether the candidate starting minute minimizes the maximum number of simultaneous snapshots. Referring to FIG. 6, the lowest maximum number (i.e., minimum of the maximum number) of simultaneous snapshots is 0 (i.e., lowest of 5, 1, 0, . . . 0, 5, 1, 0, . . . 0). Therefore, the snapshot scheduler can determine that the candidate starting minute at 10:00 fails to satisfy the first criterion (i.e., 5 is not the minimum of 5, 1, 0, . . . 0, 5, 1, 0, . . . 0); the snapshot scheduler can determine that the candidate starting minute at 10:01 fails to satisfy the first criterion (i.e., 1 is not the minimum of 5, 1, 0, . . . 0, 5, 1, 0, . . . 0); the snapshot scheduler can determine that the candidate starting minute at 10:02 does satisfy the first criterion (i.e., 0 is the minimum of 5, 1, 0, . . . 0, 5, 1, 0, . . . 0); and so on. Whether each candidate starting minute satisfies the first criterion is tabulated in FIG. 7. The candidate starting minutes that do satisfy the first criterion may be collected in a second set of candidate starting minutes (i.e., second set including 10:02, 10:03, . . . 10:28, 10:29, 10:32, 10:33, . . . 10:58, 10:59).

Determine Starting Minute from the Second Set Based on a Second Criterion

The snapshot scheduler may determine the starting minute (or more generally, starting time instance) from the second set based on a second criterion. In one embodiment, the second criterion considers the longest consecutive string of minutes (or more generally, longest consecutive string of seconds, longest consecutive string of milliseconds, etc.) in the second set, and chooses the starting minute as the minute in the center of the longest consecutive string. Continuing with the example above, suppose the second set included the minutes 10:02, 10:03, . . . 10:28, 10:29, 10:32, 10:33, . . . 10:58, 10:59. In this example, there are actually two longest consecutive strings: 10:02, . . . 10:29 and 10:32, . . . 10:59. The minute in the center of the first longest consecutive string is approximately 10:15 or 10:16. The minute in the center of the second longest consecutive string is approximately 10:45 or 10:46. In this example, any of the times 10:15, 10:16, 10:45 or 10:46 may be chosen as the starting time for the snapshots to be scheduled.

The above-described second criterion has the effect of scheduling snapshots "as far apart" (i.e., in a temporal sense) as possible from pre-scheduled snapshots. Such technique for scheduling snapshots essentially provides some "guard time" before and after a snapshot is performed, allowing a prior snapshot time to complete prior to the instant snapshot, as well as allowing the instant snapshot time to complete prior to a subsequently scheduled snapshot.

Schedule the Snapshots

After selecting the starting minute, snapshots may be scheduled in accordance with the selected starting minute (or more generally, selected starting time) consistent with any protection schedule provided in the request. Continuing with the example above, suppose that 10:15 was selected as the starting minute (or more generally, the starting time instance) and suppose that the protection schedule required snapshots every 30 minutes (or more generally, a snapshot repetition time interval) from the start hour of 10:00 (or more generally, the starting optimization window) until the end hour of 11:00 (or more generally, the ending optimization window). In this example, snapshots would be scheduled at 10:15, 10:45, 11:15 and 11:45. In the context of the snapshot map depicted in FIG. 4, one will notice that snapshots are being scheduled in the "gaps" of the snapshot map (e.g., gap between cluster of snapshots around 10:00 and cluster of snapshots around 10:30, etc.).

Determine Whether There Are Additional Snapshots to Schedule

After processing a request to schedule snapshots, the snapshot scheduler may determine whether there are additional requests to process (i.e., requests to schedule snapshots). If not, the algorithm ends. If there are additional requests, the snapshot scheduler may update the snapshot map if necessary (e.g., adding the just scheduled snapshots to the snapshot map). Then, the snapshot scheduler may repeat the algorithm from the step of determining the maximum number of simultaneous snapshots.

Further Details, Extensions and Variations

In the step of determining the maximum number of simultaneous snapshots, one detail may not have been apparent from the simplified example, which implicitly scheduled snapshots for a single day. Instead, suppose that snapshots are to be scheduled from 10:00-12:00, every thirty minutes, on Monday, Wednesday and Friday. Under these new constraints, it would be advantageous to consider the number of simultaneous snapshots over the three days. FIGS. 8A-8C depict updated versions of the intermediate tables of FIGS. 5A-5C, which includes the number of simultaneous snapshots at the minutes within candidate snapshots schedules starting at 10:00, 10:01 and 10:02 over the three days of interest. Based on these intermediate tables, the maximum number of simultaneous snapshots for the candidate starting minute at 10:00 would be 7 (i.e., the maximum of 4, 3, 2, 5, 0, 1, 6, 4, 3, 7, 1, 0); the maximum number of simultaneous snapshots for the candidate starting minute at 10:01 would be 5 (i.e., the maximum of 0, 1, 1, 0, 2, 5, 1, 3, 3, 1, 3, 2); and the maximum number of simultaneous snapshots for the candidate starting minute at 10:02 would be 3 (i.e., the maximum of 0, 0, 0, 0, 1, 1, 3, 0, 0, 2, 2, 1).

It is noted that the discussion above focused on determining the starting minute within a starting hour. Such particular framework was used for clarity of explanation. In a more general setting, the snapshot scheduler may determine a starting time within a starting optimization window (or determine a starting time from a set of candidate starting times). The granularity (or resolution) of a time instance need not be limited to minutes, and could be specified in seconds, milliseconds, or other time units.

It is further noted that in the instance where the only parameter to be optimized is the starting time, the selection of a starting time may be equivalent to the selection of a candidate snapshot schedule.

It is further noted that while the above description related to techniques for scheduling snapshots, the techniques could likewise be applied to schedule replication schedules.

While the first criterion could be to minimize the maximum number of simultaneous snapshots, other criteria are possible. In another embodiment, the snapshot scheduler may minimize the average number of simultaneous snapshots (i.e., where the average is over each candidate snapshot schedule). For instance, the average number of simultaneous snapshots for the candidate snapshot schedule starting at 10:00 (with reference to FIG. 5A) may be 3.5 (i.e., (4+3+2+5)/4).

In another embodiment, the step of "selecting the starting minute from the first set based on a second criterion" may be replaced by a user-based selection. More specifically, the snapshot scheduler may display, via a graphical user interface, the first set of candidate starting minutes (or more generally, the first set of candidate starting times), and request the user to select one of the candidate starting minutes (or more generally, one of the candidate starting times). The snapshot scheduler may then receive the user's selection of one of the candidate starting minutes, and schedule the snapshots based on the user-specified starting minute (or more generally, the user-specified starting time). In one embodiment, the first set of candidate starting minutes (or more generally, the first set of candidate starting times) may be displayed in conjunction with the snapshot map (e.g., the first set of candidate starting minutes superimposed on top of the snapshot map).

While the description above mainly considered the scenario in which the starting time was the same for each of the day(s) indicated in a protection schedule, this is not necessarily so. In another embodiment, the starting times may be independently optimized for each day (i.e., the optimization for one day being independent of the optimization for another day).

While the description above mainly considered the scenario in which a plurality of snapshots were periodically scheduled during each of the days specified in a protection schedule, this is not necessarily so. In another embodiment, only a single snapshot is scheduled for each of the days specified in a protection schedule. In this scenario, the snapshot scheduler would select the optimal time for the single snapshot. Such optimal time could be identical across the days specified in the protection schedule or could be different across the days specified in the protection schedule.

In the discussion so far, the duration of a snapshot was not a factor that was used to optimize the starting time of snapshots. One reason is that the duration of a snapshot is not always known ahead of time (and could depend on the load on the array). Another reason is that the duration of a snapshot could be quite short compared to the time scale of the snapshot map (e.g., the duration of a snapshot could be on the order of seconds, whereas the timescale of the snapshot map could be on the order of minutes). In another embodiment, the duration of a snapshot may be taken into account when optimizing the starting time of snapshots. For instance, a snapshot map may take into account the information that a certain snapshot is expected to occur from 10:00 to 10:02. In a further variant, a threshold may be used to decide whether snapshot durations should be considered. For example, any snapshot with a duration expected to take more than five minutes would be considered with its duration, while any snapshot with a duration expected to take less than five minutes would be considered without its duration. In yet another variant, the average duration of snapshots could be estimated, and the average duration of snapshots could be taken into account when creating a snapshot map.

In the discussion so far, the starting time of yet to be scheduled snapshots was optimized. In another embodiment, the starting time of already scheduled snapshots could be optimized in a similar manner (i.e., starting times could be moved to temporally separate snapshots from one another).

In one embodiment, the user does not even provide approximate start and end times, which gives the snapshot scheduler more flexibility. Under this scenario, the snapshot scheduler selects an exact start time based on one or more of the user-specified constraints of snapshot interval and snapshot days, and based on any pre-existing snapshot schedules.

In one embodiment, the snapshot scheduling feature of the array may be exposed to vCenter administrators through vvols (e.g., storage containers in the array that align with individual virtual machines).

In one embodiment, every time a virtual machine is created, a protection schedule could be created for that virtual machine, and a starting minute could be chosen for the protection schedule in accordance with the above-described techniques.

In one embodiment, every time a storage volume is created, a protection schedule could be created for that storage volume, and a starting minute could be chosen for the protection schedule in accordance with the above-described techniques.

System Diagram of Storage Array

Figure 9:
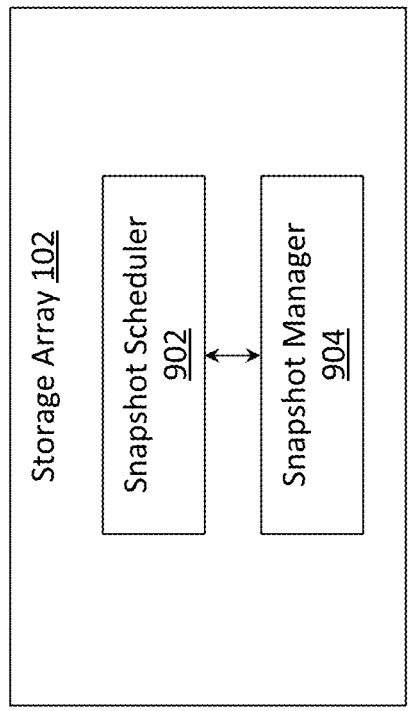
FIG. 9 depicts a block diagram of a storage array, in accordance with one embodiment.

FIG. 9 depicts storage array 102, in accordance with one embodiment. Storage array 102 may contain snapshot scheduler 902 communicatively coupled to snapshot manager 904. As described above, snapshot scheduler 902 may schedule snapshots of storage array 102 within the constraints imposed by a protection schedule and/or pre-existing snapshot schedules. Moreover, snapshot manager 904 may perform snapshots of storage array 102, in accordance with a snapshot schedule determined by snapshot schedule 902. More specifically, snapshot scheduler 902 and snapshot manager 904 may be components of controller 104 (depicted in FIG. 1) of storage array 102. It is understood that other components may be included in storage array 102 (e.g., HDD 108, SSD 110), but these components have not been depicted in FIG. 9 for ease of illustration.

It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
for each of a plurality of candidate snapshot schedules, each including a plurality of time instances at which snapshots are to be taken, determining, by a snapshot scheduler of a storage array and based on one or more pre-existing snapshot schedules, a maximum number of snapshots that are simultaneously scheduled in the one or more pre-existing snapshot schedules during the plurality of time instances within the candidate snapshot schedule;

selecting by the snapshot scheduler at least one of the candidate snapshot schedules that are associated with a lowest maximum number of simultaneously scheduled snapshots; and from the selected candidate snapshot schedules, selecting by the snapshot scheduler a subject one of the candidate snapshot schedules based on respective start times of the selected candidate snapshot schedules.

2. The method of claim 1, further comprising:
performing, by a snapshot manager of the storage array, snapshots of the storage array in accordance with the subject candidate snapshot schedule.

3. The method of claim 1, wherein the selection of the subject one of the candidate snapshot schedules comprises:
determining a longest sequence of consecutive start times of the selected candidate snapshot schedules;
determining a time at a midpoint of the longest sequence of consecutive start times; and
selecting the candidate snapshot schedule with a starting time at the midpoint time as the subject candidate snapshot schedule.

4. The method of claim 1, wherein each of the candidate snapshot schedules is defined by a start time, an end time, a period of time which separates temporally adjacent snapshots scheduled between the start time and end time, and days of the week during which snapshots are to be performed.

5. The method of claim 4, wherein the start time of each of the candidate snapshot schedules falls within a user-specified period of time.

6. The method of claim 1, further comprising receiving by the snapshot scheduler a request to schedule snapshots.

7. The method of claim 6, wherein the request includes a protection schedule that specifies a start hour, an end hour and a snapshot interval at which snapshots are to be taken.

8. A storage array, comprising:
a plurality of storage elements;
a main memory;
a processor communicatively coupled to the storage elements and the main memory; and
software instructions on the main memory that, when executed by the processor, cause the processor to:
for each of a plurality of candidate snapshot schedules, each including a plurality of time instances at which snapshots are to be taken, determine, based on one or more pre-existing snapshot schedules, a maximum number of snapshots that are simultaneously scheduled in the one or more pre-existing snapshot schedules during the plurality of time instances within the candidate snapshot schedule;
select at least one of the candidate snapshot schedules that are associated with a lowest maximum number of simultaneously scheduled snapshots; and
from the selected candidate snapshot schedules, select a subject one of the candidate snapshot schedules based on respective start times of the selected candidate snapshot schedules.

9. The storage array of claim 8, further comprising software instructions on the main memory that, when executed by the processor, cause the processor to perform snapshots of the storage array in accordance with the subject candidate snapshot schedule.

10. The storage array of claim 8, wherein the selection of the subject one of the candidate snapshot schedules comprises:
determining a longest sequence of consecutive start times of the selected candidate snapshot schedules;
determining a time at a midpoint of the longest sequence of consecutive start times; and
selecting the candidate snapshot schedule with a starting time at the midpoint time as the subject candidate snapshot schedule.

11. The storage array of claim 8, wherein each of the candidate snapshot schedules is defined by a start time, an end time, a period of time which separates temporally adjacent snapshots scheduled between the start time and end time, and days of the week during which snapshots are to be performed.

12. The storage array of claim 11, wherein the start time of each of the candidate snapshot schedules falls within a user-specified period of time.

13. The storage array of claim 8, further comprising software instructions on the main memory that, when executed by the processor, cause the processor to receive a request to schedule snapshots.

14. The storage array of claim 13, wherein the request includes a protection schedule that specifies a start hour, an end hour and a snapshot interval at which snapshots are to be taken.

15. A non-transitory machine-readable storage medium for a storage array having (i) a plurality of storage elements, (ii) a main memory, and (iii) a processor communicatively coupled to the storage elements and the main memory, the non-transitory machine-readable storage medium comprising software instructions that, when executed by the processor, cause the processor to:
for each of a plurality of candidate snapshot schedules, each including a plurality of time instances at which snapshots are to be taken, determine, based on one or more pre-existing snapshot schedules, a maximum number of snapshots that are simultaneously scheduled in the one or more pre-existing snapshot schedules during the plurality of time instances within the candidate snapshot schedule;
select at least one of the candidate snapshot schedules that are associated with a lowest maximum number of simultaneously scheduled snapshots; and
from the selected candidate snapshot schedules, select a subject one of the candidate snapshot schedules based on respective start times of the selected candidate snapshot schedules.

16. The non-transitory machine-readable storage medium of claim 15, further comprising software instructions that, when executed by the processor, cause the processor to perform snapshots of the storage array in accordance with the subject candidate snapshot schedule.

17. The non-transitory machine-readable storage medium of claim 15, wherein the selection of the subject one of the candidate snapshot schedules comprises:
determining a longest sequence of consecutive start times of the selected candidate snapshot schedules;
determining a time at a midpoint of the longest sequence of consecutive start times; and
selecting the candidate snapshot schedule with a starting time at the midpoint time as the subject candidate snapshot schedule.

18. The non-transitory machine-readable storage medium of claim 15, wherein each of the candidate snapshot schedules is defined by a start time, an end time, a period of time which separates temporally adjacent snapshots scheduled between the start time and end time, and days of the week during which snapshots are to be performed.

19. The non-transitory machine-readable storage medium of claim 18, wherein the start time of each of the candidate snapshot schedules falls within a user-specified period of time.

20. The non-transitory machine-readable storage medium of claim 15, further comprising software instructions that, when executed by the processor, cause the processor to receive a request to schedule snapshots, wherein the request includes a protection schedule that specifies a start hour, an end hour and a snapshot interval at which snapshots are to be taken.

\* \* \* \* \*